United States Patent Office 3,273,946
Patented Sept. 20, 1966

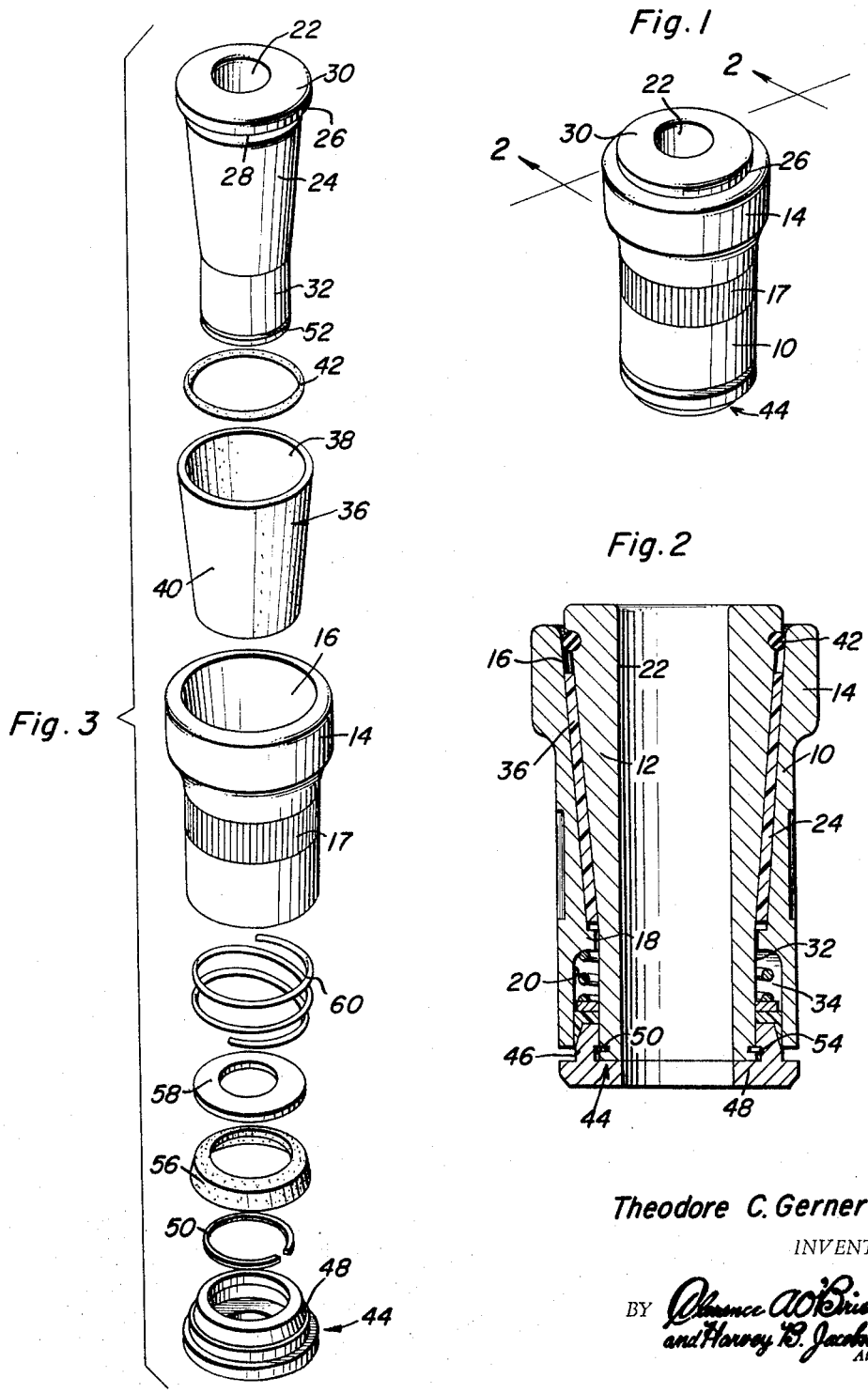

3,273,946
IDLER ARM REPAIR BUSHING
Theodore C. Gerner, 1800 S. Broadway,
Oklahoma City 9, Okla.
Filed Dec. 21, 1962, Ser. No. 246,631
6 Claims. (Cl. 308—70)

This invention comprises a novel and useful idler arm repair bushing and more particularly pertains to a repair or replacement bushing assembly specifically adapted for use in reconditioning the idler arm component of the steering linkage of an automotive vehicle and especially of the anchor end of the idler arm.

The primary object of this invention is to provide a bushing bearing assembly specifically adapted to be inserted into the anchor end of an idler arm of an automotive steering linkage in order to recondition or replace and to constitute a bearing assembly for the idler arm to journal it upon the idler arm anchor member.

A further object of the invention is to provide a device in accordance with the preceding objects which may be equally applied either as a replacement or repair unit or may be initially installed as original equipment in the steering linkage assembly of an automotive vehicle.

A further and very important object of the invention is to provide a bearing bushing assembly in accordance with the preceding objects which shall constitute a unitary assembly requiring no additional lubrication for a very long period of use or wear.

A further object of the invention is to provide a bushing bearing assembly in accordance with the preceding objects which shall include therein an automatic slack or wear take-up means to thereby greatly minimize or obviate lost motion in the bearing assembly due to the development of wear or play.

Still another purpose of the invention is to provide a bushing bearing assembly in accordance with the preceding objects which shall be of an extremely compact size and be readily applied to or removed as a unit from an idler arm and especially the journal at the anchor end thereof.

Another important purpose of the invention is to provide an efficient replacement or repair bushing assembly which may be quickly and easily applied by even a semi-skilled mechanic or a mechanically minded car owner and which will restore the bearings of the idler arm anchor end to the requisite precision fit and operation.

A further important object of the invention is to provide a self-lubricated bushing bearing assembly which shall avoid the presence of a metal-to-metal contact between bearing elements through the intreposition of a non-metallic sleeve or liner therebetween which will thereby obviate the necessity for any further addition of lubricant to the bearing assembly throughout relatively long periods of time.

A further object of the invention is to provide a device in accordance with the immediately preceding object which will enable the use of plastic liner sleeves interposed between a pair of metallic bearing elements to effect an elimination of the need of lubrication of the bearing assembly and which will overcome the difficulty encountered by sleeves of this material from cold-flowing or creeping, and will also secure the advantages of an automatic slack or wear take-up in the assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a wear-resisting replacement bushing assembly in accordance with this invention;

FIGURE 2 is a view in vertical central section taken upon an enlarged scale substantially upon the plane indicated by the section line 2—2 of FIGURE 1; and FIGURE 3 is an exploded perspective view showing the various components of the assembly of FIGURES 1 and 2.

Referring to the drawings, it will be noted that the features of this invention are applicable in many instances not only to the idler arms of steering linkages but also to bearing assemblies in various other environments in which a rugged resistance to wear, vibration and shocks and a resistance to severe and adverse weather conditions together with the desirability of satisfactory performance over long periods without lubrication are important factors.

The bushing bearing assembly consists of a compact unitary construction comprising generally cylindrical and vertically elongated outer and inner members 10 and 12 which are disposed in concentric relationship for both a limited axial sliding movement for wear take-up and slack adjusting purposes and for rotational movement in accordance with the elements which are rotatably journaled by the assembly. The members 10 and 12 are of suitable metallic construction with the outer member 10 having a diametrically enlarged annular upper end 14 and having intermediate its ends upon its exterior surface a serrated or knurled circumferentially extending portion 17. This latter portion serves as a means to rigidly and frictionally retain the outer member 10 in a bearing assembly receiving bore, recess, or socket in some member which is to be journaled by the assembly such as the idler arm of a vehicle steering system or the like. The member 10 has an opening extending axially from end-to-end thereof, which opening for its major and upper portion is provided with a tapering preferably conical bearing surface 16. Adjacent its lower end, the opening in the member 10 is provided with an inwardly extending projection which may comprise an annular rib 18 or the like while below this projection the opening is provided with a diametrically enlarged generally cylindrical bore 20 opening at the lower end of the member 10.

The inner member 12 is provided with an axial cylindrical bore 22 extending therethrough which bore is adapted to receive another element ot be journaled by the device as for example an anchor pin of a steering linkage by which the idler arm is to be journaled. It will be appreciated, however, that any other element can be received and secured in the bore 22 in order to effect a journal movement of this element relative to the element in which the outer member 10 is secured.

The exterior surface of the inner member 12 is provided with a tapering preferably conical bearing surface 24 at its upper portion and extending throughout the major length of the inner member. The uppermost external surface of the inner member is diametrically enlarged to produce an annular flange 26 and there is a circumferentially extending groove or channel 28 disposed upon the exterior surface of the inner member and between the upper end of the conical bearing surface 24 and the flange 26. The top surface of the inner member is preferably flat to provide an annular face as at 30 which may serve a variety of purposes such as to provide an abutting surface by which the inner member may be engaged by some external element during its use.

At its lower end, the inner member is provided with a cylindrical surface 32. The dimensions and proportions of the inner and outer members are such that the bearing surfaces 16 and 24 are spaced from each other by a slight distance and the surfaces are substantially coextensive axially of their members. The cylindrical surface 32 of the inner member is spaced a considerable distance from the inner surface 20 of the outer member to thus provide an annular chamber 34 therebetween.

The bearing surfaces of the inner and outer members are retained in spaced relation from each other but are supported for relative rotation by means of a sleeve, insert or liner 36 of a generally conical configuration and which is of a non-metallic material. Preferably a commercially available plastic such as Delrin which is manufactured by Du Pont may be employed. It is desired that the liner 36 shall have the properties of extreme hardness and resistance ot wear, have little or no need for the introduction of lubricant between it and the adjacent members and may be substantially permanently retained in assembled relation between the two members.

The sleeve 36 preferably has internal and external conical surfaces 38 and 40 which cooperate with and may be complementary to and are in direct contact with the surfaces 24 and 16 of the inner and outer members respectively. Preferably the sleeve is of slightly less length than the adjacent bearing surfaces 24 and 16 so that a slight clearance is provided at the opposite ends of the sleeve between it and adjacent portions of the members for a purpose to be subsequently apparent. The sleeve is preferably although not necessarily of a uniform thickness between its internal and external surfaces over its entire bearing surface-engaging area.

A characteristic of a non-metallic or plastic material of this nature is that there is an unavoidable slight cold-flowing or creeping of the sleeve under pressure and during use. Consequently, it is desired to make provision for a slight clearance to permit such unavoidable creeping of the sleeve. For this purpose, as indicated in FIGURE 2, a slight clearance is provided between the lower end of the sleeve and the inwardly extending projection 18 which constitutes a limit or stop for the sleeve to limit the amount of movement of the end of the sleeve in a downward direction within the outer member. Additional clearance is provided between the upper end of the sleeve and a packing or sealing O-ring 42 which is received in the previously mentioned channel 28 in the inner member 12. The O-ring provides a sealing means which seals and encloses the upper end of the sleeve in the space between the inner and outer members to prevent the ingress of dirt and the like. The member 18 to some extent serves the same function at the lower end of the sleeve but a complete sealing of the lower end of the unit is effected by the provision of a closure cap 44 which is removably secured to the lower end of the inner member 12 and cooperates with the lower end of the outer member for several important purposes.

The cap 44 consists of a cylindrical skirt 46 whose inner or upper end terminates in a conical or tapering surface 48 to facilitate the insertion of this skirt into the open lower end of the outer member and into the chamber 34 therein. The cap also includes an annular head or flange 49 which projects both internally and externally from the skirt to respective overlie the lower ends of the inner member 12 and of the outer member 10 as shown in FIGURE 2.

The cap is detachably secured to the lower end of this inner member as by means of a split ring 50 which is inserted in cooperating circumferentially extending locking channels or grooves 52 upon the exterior surface of the inner member and in a corresponding groove 54 on the interior surface of the cap 30.

A plastic cup-shaped washer 56 is engaged over the end and beveled surface 48 of the cap and in turn abuts against a metallic washer 58. A compression spring 60 is received within the chamber 34, abutting at one end against the rib 18 and at its other end against the metal washer 58. This spring serves to yieldingly urge the cap and therefore the attached inner member 12 in a downward position and in a direction which will cause a wedging engagement of the bearing surfaces of the inner and outer members with the corresponding surfaces of the sleeve 36.

It will be noted that the bearing engagement between the members is sealed at both extremities of the outer member by means of the O-ring 42 at the upper end and by means of the cap 44 and the plastic cup 56 at the lower end thereof.

The arrangement is such that the spring means yieldingly urge the inner member inwardly of the outer member in order to effect a wedging engagement which will take-up wear or slack developing during the rotation of these members.

It should be noted that in the bearing assembly of this invention, I may make use of such conventional expedients as the employment of powder metallurgy in the fabrication of various of the components of the assemblies.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bearing bushing assembly comprising outer and inner members having complementary cooperating tapered conical bearing surfaces, a non-metallic wear resistant bearing sleeve rotatably interposed between said surfaces, said sleeve having complementary tapered internal and external surfaces respectively engaging and cooperating with said inner and outer member surfaces, said outer member having an inwardly extending projection comprising a limit stop for limiting axial movement of said sleeve upon said outer member surface towards the smaller end of the latter.

2. The combination of claim 1 wherein said outer member has an internal bore extending from said projection to its adjacent end, a spring in said bore abutting against said projection, means on said inner member engaging said spring whereby the latter will yieldingly urge said inner member axially of said outer member in a direction to cause said member surfaces to compressively embrace said sleeve.

3. An adjustable slack take-up bearing bushing assembly comprising concentric outer and inner members having cooperating tapered conical bearing surfaces, a bearing sleeve rotatably interposed between said member surfaces, said sleeve having conical internal and external surfaces cooperatively and movably engaged with said surfaces of said inner and outer members respectively, sealing means interposed between said members at their opposite ends enclosing said sleeve, resilient means within said outer member for yieldingly and axially urging said inner member surface into wear take-up engagement with said sleeve and the latter into wear take-up engagement with said outer member surface.

4. The combination of claim 3 including an inwardly extending projection in said outer member, both an abutment engaging said resilient means and a limit stop engageable with said sleeve for limiting slack take-up movement of the latter.

5. The combination of claim 3 wherein said sealing means includes a cap having an annular head and a cylindrical skirt, said skirt being releasably received between the ends of said members and said head overlying the adjacent open ends of said members, means releasably securing said cap to said inner member.

6. The combination of claim 5 wherein said inner member and cap have aligned, axial bores therethrough for the reception of an element to be journaled.

(References on following page)

References Cited by the Examiner

UNITED STATES PATENTS

| | | | |
|---|---|---|---|
| 267,872 | 11/1882 | Gambllee | 308—100 X |
| 501,727 | 7/1893 | Moore. | |
| 2,913,251 | 11/1951 | Herbenar | 308—71 X |
| 3,039,786 | 6/1962 | Punches | 287—93 X |
| 3,124,394 | 3/1964 | Rowlett | 308—70 X |

FOREIGN PATENTS 106,595  9/1924  Switzerland.

DAVID J. WILLIAMOWSKY, *Primary Examiner.*

ROBERT C. RIORDON, *Examiner.*

D. C. CHAMPION, R. F. HESS, *Assistant Examiners.*